United States Patent [19]

Altherr

[11] Patent Number: 4,762,334
[45] Date of Patent: Aug. 9, 1988

[54] FIFTH WHEEL BRACKET MOUNTING ASSEMBLY

[75] Inventor: Russell G. Altherr, Munster, Ind.

[73] Assignee: AMSTED Industries Incorporated, Chicago, Ill.

[21] Appl. No.: 116,166

[22] Filed: Nov. 3, 1987

[51] Int. Cl.⁴ .............................................. B62D 53/08
[52] U.S. Cl. ..................................... 280/433; 296/30; 403/387
[58] Field of Search .................. 280/433, 407, 438 R, 280/439, 440, 441; 52/280, 278; 296/29, 30; 403/387, 386, 384

[56] References Cited

U.S. PATENT DOCUMENTS 3,476,405  11/1969  Cunha ............................. 280/407 X
3,479,055  11/1969  Cunha et al. ........................ 280/407
3,584,899  6/1971   Gottler et al. ...................... 280/407

Primary Examiner—John A. Pekar
Attorney, Agent, or Firm—Charles E. Bouton; Edward J. Brosius

[57] ABSTRACT

A fifth wheel bracket mounting arrangement for fastening the bracket to the frame of a tractor having a frame including spaced channels. The mounting arrangement includes a mounting plate having one edge clamped to the horizontal flange of the channel member adjacent the free edge of the flange and secured to an angle member on the opposing side of the channel.

10 Claims, 2 Drawing Sheets

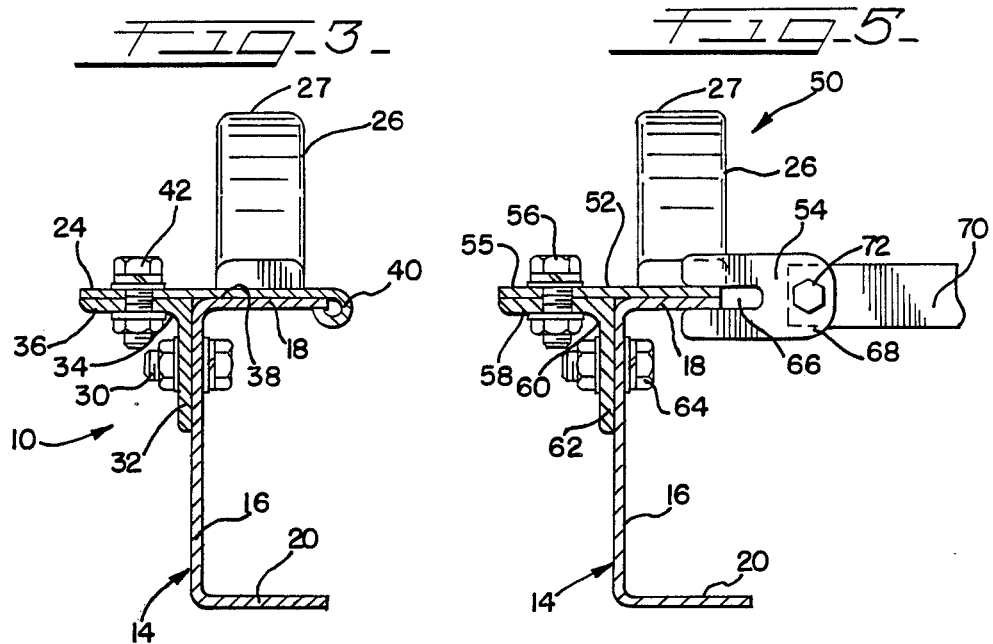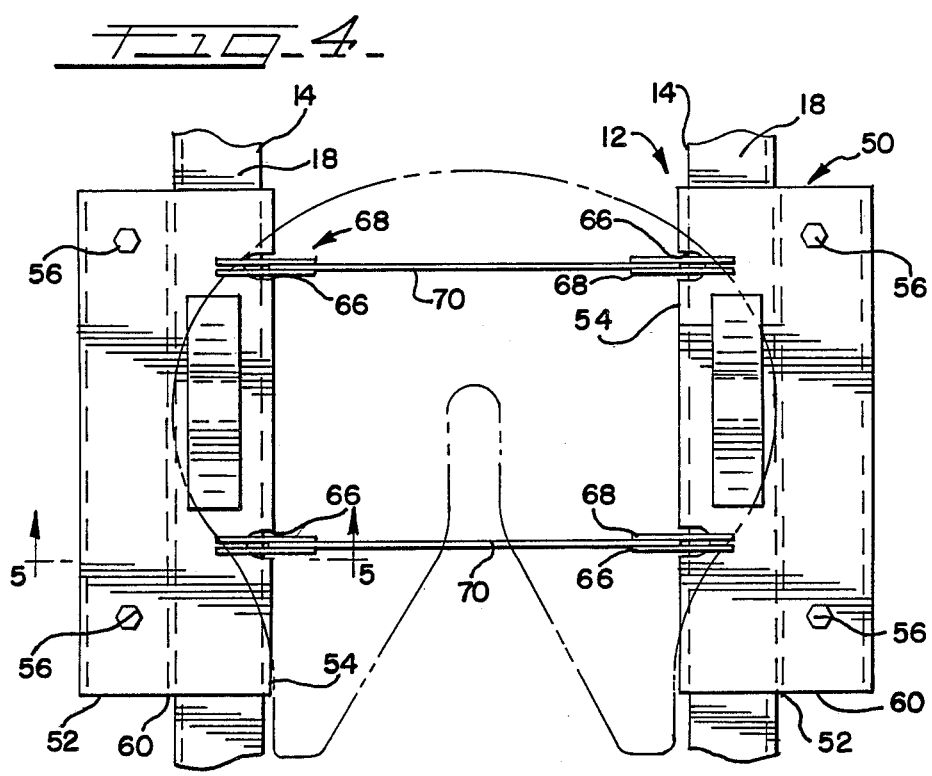

FIFTH WHEEL BRACKET MOUNTING ASSEMBLY

FIELD OF THE INVENTION

The present invention relates to fifth wheels for over the highway tractors by which trailers are demountably connected to the tractors, and more particularly to an improved mounting structure for securing the fifth wheel brackets to the tractor frame.

BACKGROUND OF THE INVENTION

Tractor frames to which fifth wheels are secured generally include a pair of longitudinally extending and transversely spaced channel members of C-shaped cross section. The fifth wheels are mounted on the channels by brackets. The brackets are supported by the upper horizontally projecting flange of the channels and are required to transmit (a) lateral inertial forces and moments from curving and rocking of the trailer, (b) longitudinal forces and moments from acceleration, deceleration and downward forces on the ramps eccentric to the rear of the bracket pivot center while preparing to couple. These conditions can produce locally high lifting forces between the bracket and the tractor frame. The brackets are constructed to permit limited longitudinal tilting of the fifth wheel relative to the frame.

In order to minimize twisting of the frame and channels, it is desirable that loads assumed by the frame through the fifth wheel be transmitted near to the shear center of the total frame structure and near to the vertical web of each channel. Heretofore various structural arrangements have been used in an endeavor to achieve such a result.

SUMMARY OF THE PRESENT INVENTION

By the present invention it is proposed to provide a simple and economical fifth bracket mounting arrangement which serves to transmit the loads through the vertical webs of the tractor frame members.

This is accomplished generally by a bracket mounting arrangement including a mounting plate to which the brackets are secured. The mounting is supported on the upper horizontal flange of the channel and a horizontal leg of an outboard angle of which the other end is fixed to the vertical web.

The mounting plate is bolted to the horizontal leg of the angle member and is clamped to the marginal edge portion of the underlying horizontal flange of the frame channel members. Clamping the mounting plates to the free marginal edge portions of the frame channel serves to unify the structure and substantially minimizes twisting of the tractor frame.

In one form of the invention, the bracket mounting plate is curled about the free edge of the horizontal channel flange to clamp the plate thereon.

In another form of the invention, the mounting plate overlying the upper horizontal channel flange projects beyond the free edge of the flange. The projecting portion of the mounting plate is provided with notches for accommodating metal clinching clamps which secure the mounting plate to the upper horizontal flange.

In both forms of the invention the length of the horizontal leg of the angle is substantially equal the length of the upper horizontal flange of the frame of frame channels. Thus, with the mounting plates secured to the angle horizontal leg and also to free edge of the upper horizontal channel flange, the load is transmitted near to the shear center of the vertical web of the frame channels.

Further features of the invention will be apparent from the following description.

BRIEF DESCRIPTION OF THE DRAWINGS

FIG. 3 is an enlarged cross-section view taken generally along the lines 3—3 of FIG. 2 and showing details of bracket mounting arrangement;

FIG. 4 is a top plan view of another embodiment of a bracket mounting arrangement for mounting a fifth wheel on a tractor frame; and FIG. 5 is an enlarged cross-sectional view of the bracket mounting taken generally along the lines 5—5 of FIG. 4.

DESCRIPTION OF THE PREFERRED EMBODIMENT OF THE INVENTION

Figure 1:
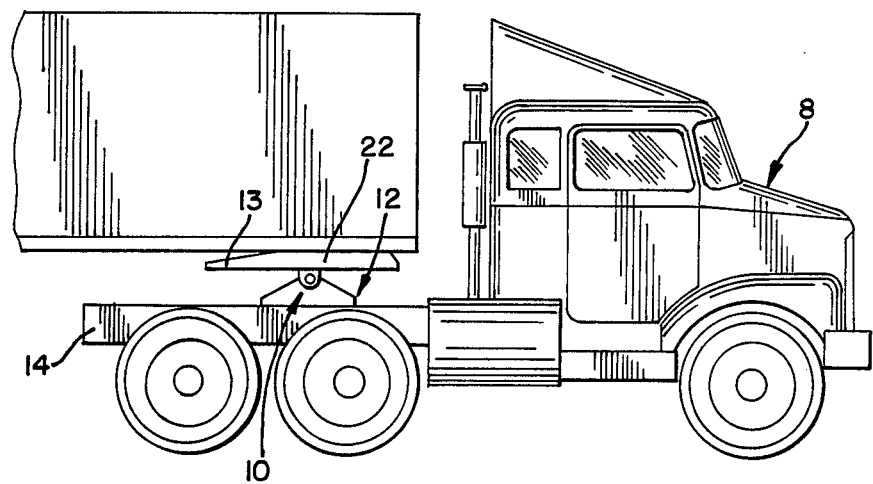
FIG. 1 is a side view of a tractor with a fifth wheel.
Figure 2:
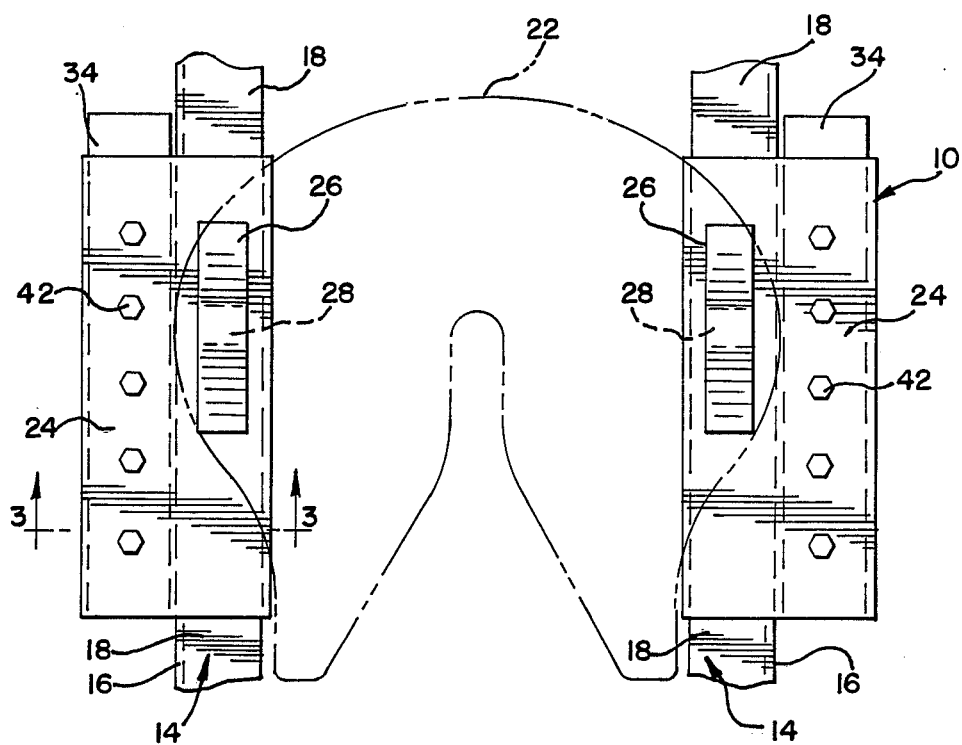
FIG. 2 is a fragmentary top plan view of a tractor frame showing the fifth wheel bracket mounting arrangement embodying the structure of the present invention.

Referring now to FIG. 1, there is shown an over the road tractor 8 with a fifth wheel bracket mounting arrangement generally 10 mounted on a frame generally 12 of the tractor and supporting a trailer. The frame 12 includes a pair of horizontal and longitudinally extending and transversely spaced channels 14 of substantially C-shaped cross section. The channels 14, better seen in FIGS. 2 and 3, are each positioned with a vertical web 16 and upper and lower horizontal flanges 18 and 20 extending inboard toward the center of the tractor frame 12.

As shown a fifth wheel 22, having pick up ramps 13, is mounted on the channels 14 by means of the bracket assembly or arrangement 10 embodying the structure of the present invention. One embodiment of the bracket assembly 10, shown in FIGS. 2 and 3, includes two bracket mounting plates 24, on each of which there is mounted a bracket 26 having an arched bearing surface 27 to support a fifth wheel 22 and has a pin hole 28 for receiving the bracket retaining pins of the fifth wheel 22.

Fastened to the vertical web 16, as by bolts 30, is one leg 32 of an angle member 34 extending along a length of the web 16. The other leg 36 is located so as to provide a planar support surface 38 coextensive with the upper flange 18 of the channel 14. The angle member 34 is of substantially coextensive with the bracket mounting plate 24.

As shown, the support or mounting plate 24 along its inner edge 40 is curled in clinching relationship about the terminal edge of the channel upper flange 18. The mounting plate 24 overlying the angle leg 34 is secured thereto as by bolts 42.

Each of the brackets 26 is secured to the respective mounting plate 24 by welding so as to overlie the flange 18. With the mounting plate 24 thus attached to the angle member 34 and the curled edge 40 clinched about the inboard edge of the channel flange 18, twisting of the tractor frame is minimized by assuring that the vertical load imposed thereon is maintained in close proximity to the vertical web 16 of the channel 14. This tends to cause the bracket assemblies 10 on the frames to function in unison with the upper half of the tractor frame to enhance the strength and reliability of the entire system.

Similar results are achieved with another embodiment of the invention shown in FIGS. 4 and 5 wherein like parts are designated with like reference characters.

As shown in FIGS. 4 and 5, bracket assemblies 50 each include a bracket mounting plate 52 having an inboard marginal portion 54 projecting beyond the terminal edge of the underlying terminal edge of the upper channel flange 18. The outboard marginal edge portion 55 is fastened, as by bolts 56, to a horizontal leg 58 of an angle 60. The other leg 62 is fastened to the vertical web 16 of the channel 14, also as by bolts 64.

The brackets 26 are each secured to the respective mounting plates 52 by welding so as to be located in overlying relationship to the channel flange 18.

In order to secure the mounting plate 52 to the underlying channel flange 18, resilient clothes pin type clamps 68 clampingly or clinchingly clasp the mounting plate 52 to the flange 18. Clamps 68 may be singly or multiply located fore and aft of the bracket 26.

To prevent the clamps 68 from moving away from the channel web 16, they may be attached to each end of a spacer strip or bar 70 by a bolt or pin clip 72. To prevent clamps 68 from moving along the length of channel 14, whereby spacer 70 would become ineffective, lengthwise spaced notches 66 are contained in marginal portion 54 of mounting plate 52 where the notch width will accommodate the multiplicity of clamps 68 that are intended to be used in each notch 66.

From the foregoing it should be readily apparent that the structure of the embodiment of FIGS. 4 and 5 also fasten the mounting plate to the angle and along the free or terminal edge of the web such that the system functions in the same manner as the embodiment of FIGS. 2 and 3.

What is claimed is:

1. A fifth wheel bracket mounting arrangement for a tractor frame having a pair of transversely spaced and longitudinally extending channel members including inboard facing upper horizontal flanges extending from a vertical web, said bracket mounting arrangement comprising:
    an angle member fixed to the outboard face of each of said vertical webs of said channel members;
    a bracket mounting plate mounted on a horizontal leg of said angle and overlying said upper horizontal flange;
    said mounting plate being fastened to said horizontal leg of said angle and clampingly secured along the free edge of said underlying upper horizontal flange of said channel members.

2. The invention as defined in claim 1 wherein said mounting plate is formed with a curled edge and said curled edge is clinched about the terminal edge of said upper horizontal flange of said channel.

3. The invention as defined in claim 2 wherein said horizontal angle leg is substantially coextensive with said bracket mounting plate.

4. The invention as defined in claim 1 wherein said bracket mounting plate includes a marginal edge portion projecting inwardly of the terminal edge of said upper horizontal flange of said channel;
    said marginal edge portion being formed with a plurality of lengthwise spaced notches;
    and wherein clip means are accommodated with said notches;
    said clip means clamping said bracket mounting plates to said upper horizontal flange along the terminal edge thereof.

5. The invention as defined in claim 4 wherein said clip means comprise at least a pair of side by side clips disposed in each of said notches to clamp said bracket mounting plate to said upper horizontal flange, and said clips are separated by a bar extending between opposing ones of said notches mounted on respective ones of said channel members.

6. The invention as defined in claim 5 wherein the length of said horizontal angle leg is substantially coextensive to the length of said bracket.

7. The invention as defined in claim 1 wherein said bracket mounting plate includes a marginal edge portion overlying an inward terminal edge of said upper horizontal flange of said channel; and wherein clip means are placed about said marginal edge portion and said terminal edge so as to hold said bracket mounting plate to said flange.

8. The invention as defined in claim 7 wherein each of said channel member horizontal flanges has an overlying bracket mounting plate and wherein a spacer bar is connected between clip means of the respective bracket mounting plates so as to prevent inward displacement of said clip means.

9. The invention as defined in claim 7 wherein each clip means is located in notches formed on each said bracket mounting plate and flange so as to prevent longitudinal displacement of said clip means.

10. The invention of claim 7 wherein each clip means is a clothes pin type clamp.

* * * * *